US006314632B1

(12) United States Patent
Athan et al.

(10) Patent No.: US 6,314,632 B1
(45) Date of Patent: Nov. 13, 2001

(54) STEERING WHEEL PULLER AND METHOD

(75) Inventors: Carl Wayne Athan, Martinez; Paul R. Farris, Augusta, both of GA (US)

(73) Assignee: Club Car, Inc., Augusta, GA (US)

( * ) Notice: Subject to any disclaimer, the term of this patent is extended or adjusted under 35 U.S.C. 154(b) by 0 days.

(21) Appl. No.: 09/558,197

(22) Filed: Apr. 26, 2000

(51) Int. Cl.[7] .................................................... B23P 19/00
(52) U.S. Cl. .............................. 29/426.5; 29/256; 29/259
(58) Field of Search ............................ 29/402.03, 426.5, 29/256, 257, 258, 260, 261, 262, 264, 266, 267, 270, 273, 276, 277, 259

(56) References Cited

U.S. PATENT DOCUMENTS

| | | | | |
|---|---|---|---|---|
| Re. 18,556 | * | 8/1932 | Cornwell . | |
| 1,383,382 | | 7/1921 | Brockway . | |
| 3,237,291 | | 3/1966 | Kelso . | |
| 4,542,571 | * | 9/1985 | Sullivan | 29/426.5 X |
| 4,672,731 | | 6/1987 | Taylor . | |
| 4,864,709 | | 9/1989 | Klucz et al. . | |
| 4,868,965 | | 9/1989 | Drymon . | |
| 4,903,391 | * | 2/1990 | Franks | 29/266 X |
| 5,033,180 | * | 7/1991 | Colson | 29/259 |
| 5,781,978 | | 7/1998 | Fleming . | |
| 5,898,985 | | 5/1999 | Villarreal . | |
| 6,185,817 | * | 2/2001 | Sims et al. | 29/889.1 X |

* cited by examiner

*Primary Examiner*—S. Thomas Hughes
*Assistant Examiner*—Steve Blount
(74) *Attorney, Agent, or Firm*—Michael Best & Friedrich LLP

(57) ABSTRACT

A steering wheel puller which is both easy to assemble and safe to use is disclosed. The puller is effective for removing the steering wheels from vehicles such as golf carts and utility vehicles. An actuator portion of the puller is placed through the top of the wheel to positively engage a base plate at the bottom of the wheel. The actuator portion has a screw which engages the steering column shaft of the vehicle at the center of the steering wheel. As this screw is tightened, the downward force on the steering column and the upward force of the base plate on the steering wheel causes the steering wheel to dislodge.

9 Claims, 3 Drawing Sheets

STEERING WHEEL PULLER AND METHOD

TECHNICAL FIELD

The present invention relates to a tool used to remove steering wheels from golf carts or other small utility vehicles.

BACKGROUND

Golf carts and utility vehicles typically have steering wheels which are removable. The steering wheel may removed to be repaired or refurbished or may just be replaced with a new wheel. Other repairs to the vehicle may require removal of the steering wheel as well. The wheel must be removed from the steering column to allow the column to be removed from the chassis so that repairs can be made.

Often, steering wheels on these types of vehicles are difficult to remove from the columns. First, the base of the steering wheel is designed to fit tightly around the top portion of the steering column shaft. In some manufacturer's vehicles, a tapered column provides a tight fit with the steering shell. Also, buildup of rust or other foreign matter can make the wheel stick to the column and be difficult to remove. The maintenance personnel thus typically use hammers or other tools to dislodge the steering wheel from the steering column shaft However, these methods can cause damage to the wheel, column or shaft. These methods can also cause the wheel to fly off the shaft causing damage to the steering wheel itself or injuring the person removing the wheel or a bystander. There is therefore a need to provide an apparatus and method for removing a steering wheel from the steering column of golf carts, maintenance vehicles and the like, where the steering wheel is engaged on the steering column by a frictional fit.

SUMMARY OF THE INVENTION

The present invention is therefore directed to a steering wheel puller and method of removing a steering wheel from frictional engagement with a steering column. The steering wheel puller of the present invention comprises an actuator portion and a base plate. The actuator is positioned relative to the top of the steering wheel and is selectively attached with the base plate positioned to positively engage the underside of the steering wheel. The actuator comprises a steering column engaging portion selectively positioned to engage a top portion of the steering column on which a steering wheel is mounted, and a plate engaging portion. A drive member selectively provides relative movement between the column engaging portion and plate engaging portion. The base plate is selectively attached in the plate engaging portion and is configured to extend into positive engagement with at least a portion of the underside of a steering wheel. Upon operation of the drive member, the base plate is selectively moved upwardly relative to the column engaging portion to pull the wheel upwardly therewith. The upward force of the base plate on the wheel causes the wheel to dislodge from the steering column shaft while being positively retained relative to the actuator and base plate. This arrangement provides for simplified removal of the steering wheel without damage, and ensures safety in the removal.

It is an object of the present invention to provide a tool which removes steering wheels from golf carts and utility vehicles without damaging the steering wheel, steering column, steering shaft or other structure. It is also an object of the present invention to provide a tool for removing steering wheels which removes the wheel safely by not allowing the wheel to fly off the shaft.

It is a further object of the present invention to provide a steering wheel puller which fits any model of golf cart or utility vehicle.

It is another object of the present invention to provide a steering wheel puller and kit which is simple to assemble for use and disassemble for reuse or storage.

DETAILED DESCRIPTION

In the following detailed description of the preferred embodiments of the present invention, reference is made to the accompanying drawings which, in conjunction with this detailed description, illustrate and describe an embodiment of the steering wheel puller and method of its use according to the present invention.

Figure 1:
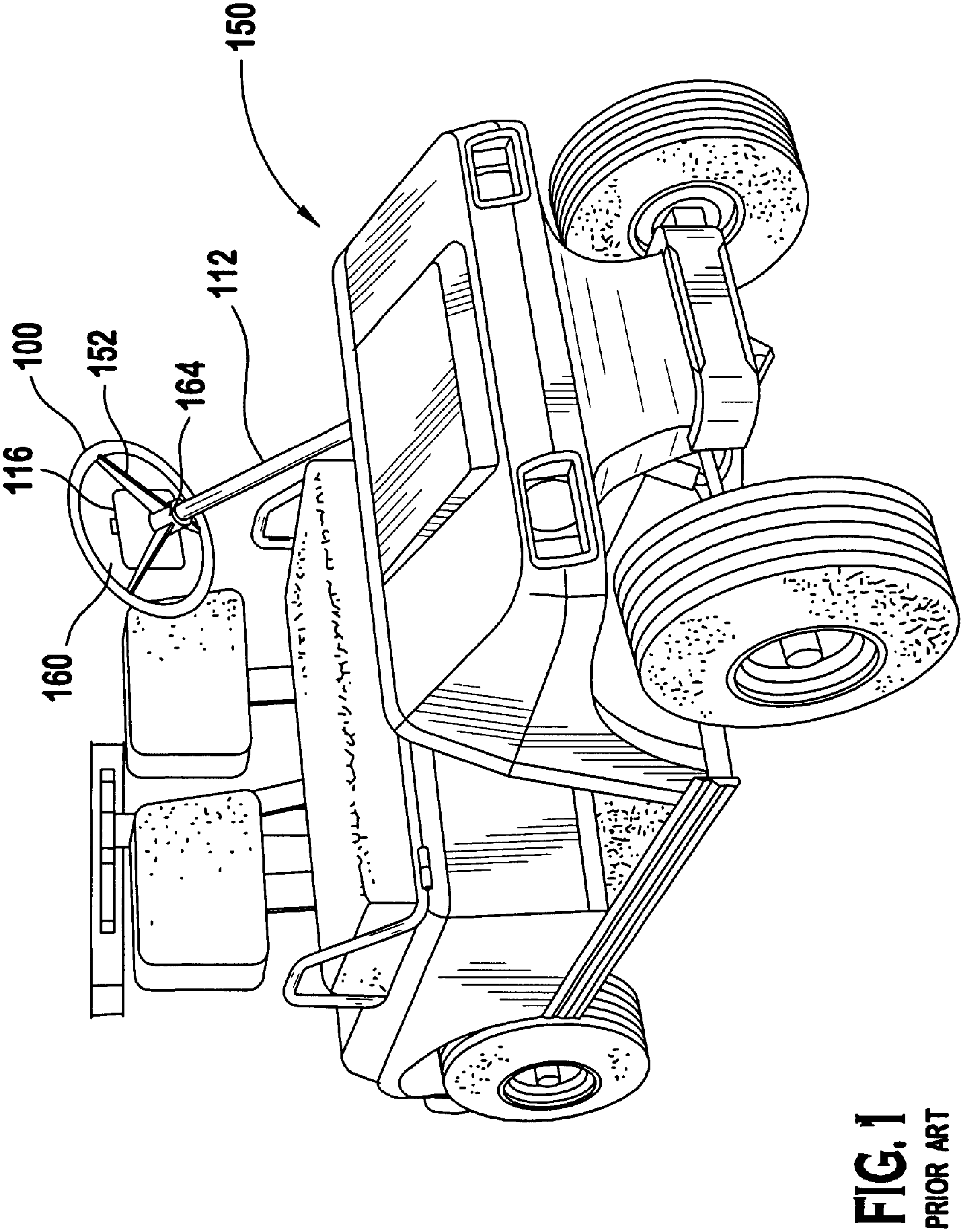
FIG. 1 PRIOR ART
FIG. 1 shows an example of a vehicle having a steering wheel which can be removed using the present invention.
Figure 2:
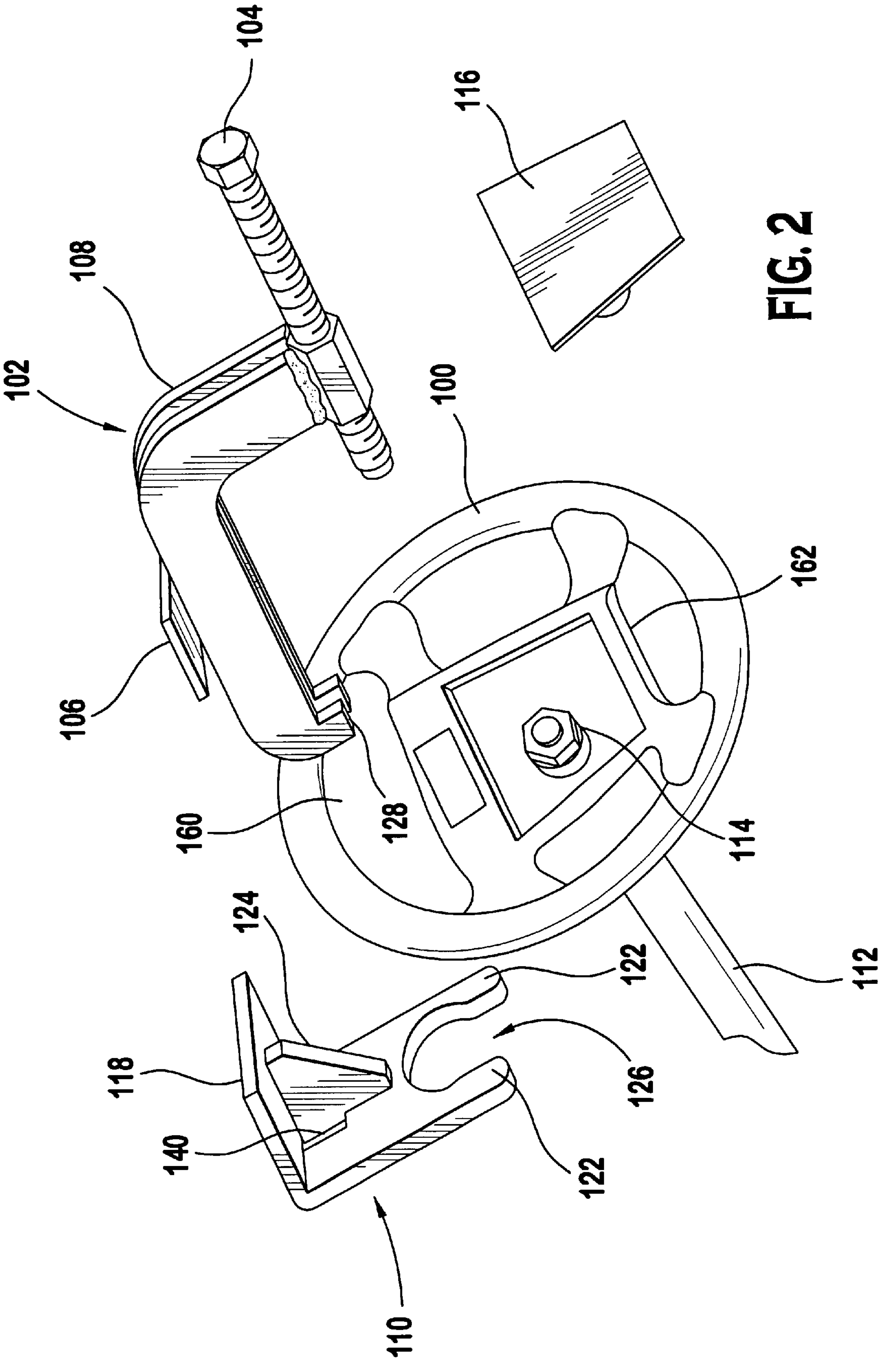
FIG. 2 illustrates the assembly of an embodiment of the steering wheel puller of the present invention.

FIG. 1 illustrates an example of the type of vehicle 150 which has a steering wheel 100 which can be removed by the puller of the present invention. Steering wheels associated with such vehicles typically comprise a wheel portion, which has openings 160 either because the wheel contains "spokes" 152, separating the wheel into sections, or by having some other structure in the center of the steering wheel (FIG. 2, 162). On golf carts, the steering wheels may also contain a scorecard plate 116 or other structures. The base of the steering wheel 164 fits over and is frictionally engaged to the steering column shaft 112. It is contemplated that the present invention could be used with a variety of steering wheel configurations and is not limited to the example contained herein.

FIG. 2 illustrates the steering wheel puller assembly according to an embodiment of the present invention. The assembly is comprised of an actuator portion 102 and a base plate 110. The actuator portion may comprise a steering column engaging portion and a plate engaging portion, represented by and an anvil screw 104 and lower portion of anvil 108. A drive mechanism, which in this embodiment is the threaded screw 104, provides driven movement of the screw 104 relative to the anvil 108 and plate engaging portion. The anvil screw is located at one end of the actuator and the anvil portion forms a curved "L" shape. The anvil 108 may be constructed as a double anvil t increase the structural integrity thereof if desired. To further strengthen the anvil portion 108 at the location of the plate engaging portion, a positioning plate 106 may be disposed along the edge portion, preferably at a position to facilitate attachment of the base plate as will be described. The end of the anvil portion opposed to the anvil screw 104 includes the structure for selective attachment of the base plate 110. In the embodiment shown, the anvil 108 includes a support structure 128 to selectively engage a base plate 110.

The embodiment as shown in the Figures provides the actuator with a design to be selectively positioned operatively relative to the steering wheel 100 and column 118 from only one side thereof. In this embodiment, the anvil 108 fits through an opening (FIG. 1,152; FIG. 2,160) in a steering wheel 100 of a golf cart or maintenance vehicle, to then selectively engage the base plate 110 positioned under the steering wheel. The actuator portion 102 is positioned on the steering wheel from the top. The anvil portion 108 is selectively placed through the opening such that the lower end of anvil screw 104 is on the top, at the center of the steering wheel, to engage the top portion of the column 118. The screw 104 extends through an opening in the center of the steering wheel to engage the steering column shaft The base plate in this embodiment has an opening 126 which is configured so as to fit around the steering column shaft and the base of the steering wheel 100. The design allows the plate to engage the bottom of the steering wheel 100. Feet 122 extend at least partially around the opening 126 in this embodiment, to engage a greater portion of the bottom of the steering wheel 100 and to prevent the base plate from falling off of the steering column. It is contemplated by the present invention that multiple base plates having openings of various sizes be provided with the puller assembly. The base plate is designed to engage either the very bottom of the steering wheel directly adjacent the column 112, or to engage the steering wheel at a position above this location. However, base plates may be custom made for a particular size of steering wheel or made adjustable to fit various steering wheel models. In addition, base plates may fit straight or tapered steering column shafts.

The base plate may also have a backing plate 117 for support or positioning the base plate 118 on the actuator portion of the assembly.

Figure 3:
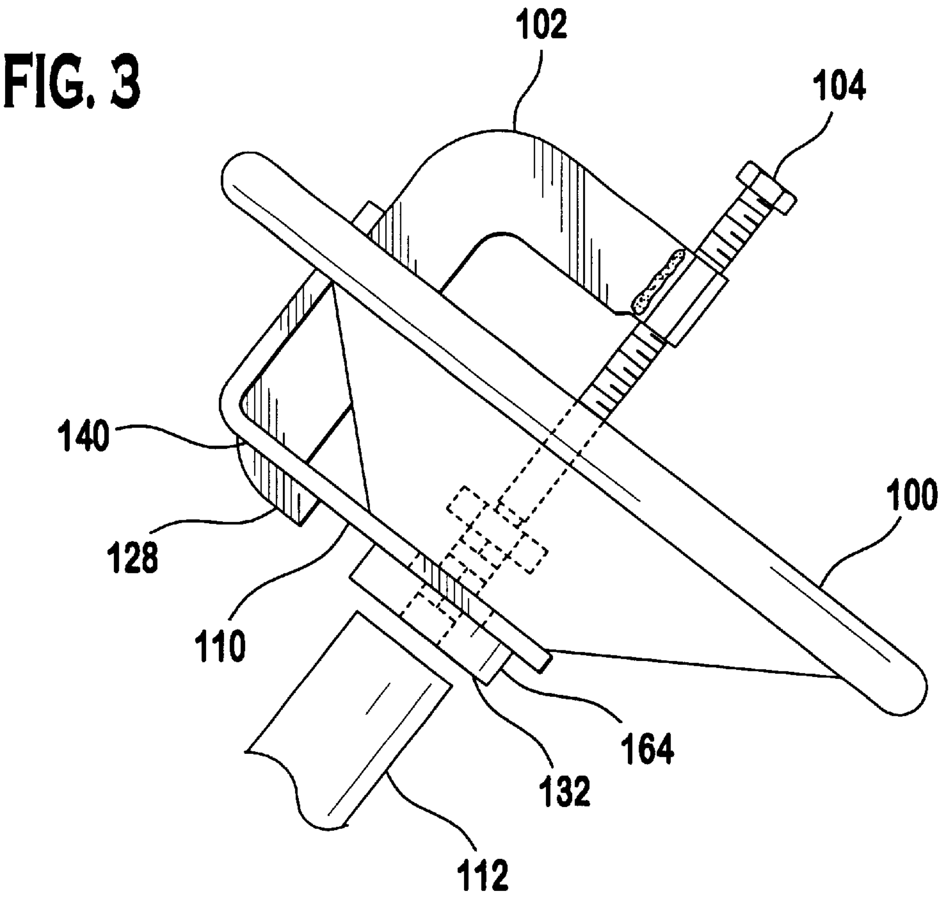
FIG. 3 illustrates an embodiment of an assembled steering wheel puller of the present invention with a late model center section steering wheel.

The base plate also has a means for engaging the anvil portion when the anvil is placed through the top of the steering wheel and the base plate is placed under the steering wheel. In the embodiment shown, the anvil portion 108 may again have a double plate structure. The end of the anvil portion may terminate in a pair of feet 128 which fit through slots 140 in the base plate as shown in FIGS. 2 and 3. The slots are configured so that when the feet of the anvil portion are placed through the slots, the anvil and base plate can be locked in position by upward rotation of the actuator portion. The base plate may also have an outwardly extending reinforcing portion 124 which fits into the opening between the two plates in the anvil portion. The backing plate 118 engages the outside portion of the anvil 108, and the lower end of positioning plate 106. Thus when fully assembled the actuator portion 102 is selectively connected to the base plate 110 around the steering wheel 100 (FIGS. 2 and 3) in a simple manner. The actuator portion and base plate may be releasably connected into the assembled position about a steering wheel column 112, and a variety of other structures in addition to that shown in the embodiment depicted may be used.

The base plate is of generally constructed of sufficient size to cover enough of the back portion of the steering wheel so that equal force will be applied to the entire back portion of the steering wheel. In this manner, the steering wheel is uniformly released from the column in a controlled and safe manner.

The entire steering wheel puller assembly is preferably made of materials strong enough to withstand the force necessary to remove the steering wheel without deforming or breaking.

Figure 4:
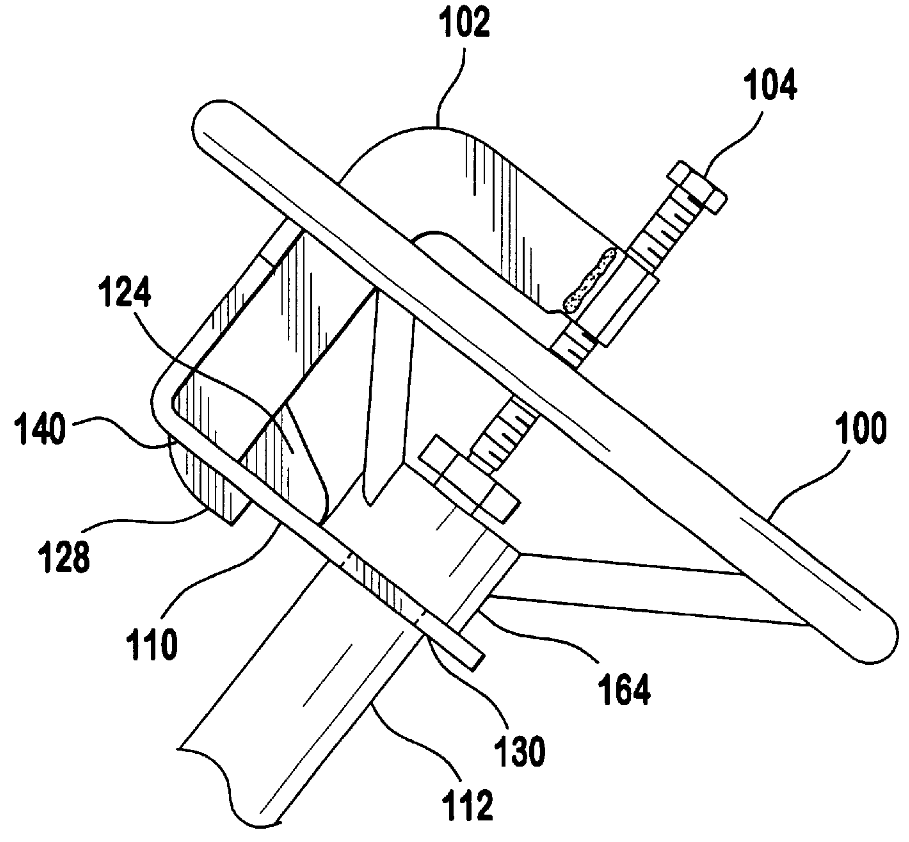
FIG. 4 illustrates an embodiment of an assembled steering wheel puller of the present invention with an older three-spoke steering wheel.

The steering wheel puller of the present invention may be used in the following manner. First, on golf carts or vehicles which have a score card plate 116, this must be removed first in order to access the steering wheel retaining nut 114. Then, the steering wheel retaining nut 114 is loosened but not removed from the wheel. Next the puller assembly is loaded onto the steering wheel. The actuator 102 is placed through an opening 160 of the steering wheel, so that the base plate engagement portion goes through the opening towards the bottom of the steering wheel and the anvil screw is at the center of the wheel. The actuator is positioned so that the end of the anvil opposite. The base plate is placed over the steering column shaft. The actuator and base plate are connected together around the steering wheel as shown in FIGS. 3 and 4. Once the assembly is loaded onto the steering wheel, the anvil screw can be screwed down until it contacts the steering column shaft. The anvil screw is tightened by use of any suitable power tool, for example, an air wrench or drill for tightening the anvil screw or manually, to apply pressure to the steering column shaft. As the anvil screw 104 is extended from the anvil 108, the base plate 110 in turn is urged against the underside of the steering wheel 100. The anvil screw 104 is rotated to apply a uniform force to the steering wheel against its fixed positioned on the column 118, regardless of whether the shaft is straight or tapered. The anvil screw 104 is rotated until the steering wheel 100 dislodges from the steering column shaft 118. The steering wheel, steering wheel retaining nut and puller assembly are then removed from the shaft and the puller assembly can then be disassembled and removed from the steering wheel. Removal of the steering wheel 100 is performed easily, and without damaging the wheel 100 or column 112. The procedure also ensures the wheel 100 cannot fly off of the column 112, as it is retained in the assembled puller.

Disassembly of the steering wheel puller of the present invention facilitates easy storage of the apparatus. Once the base plate and actuator portions are disengaged, the pieces will lie flat in a drawer or other storage area.

The invention also provides a kit for disassembling a steering wheel from a steering column, wherein multiple, interchangeable base plates 110 are provided in association with a generic actuator 102. Each of the base plates 110 are configured to be selectively attached to the actuator 102 for operation, while providing a differing column steering wheel or engaging structure. A kit including base plates for fitting any OEM manufactured golf cart or utility vehicle would provide flexibility to the user. Alternatively, the differing column steering wheel or engaging structures may be provided as inserts into a generic base plate structure.

Although the invention has been described with reference to particular embodiments, various modifications or alterations are contemplated in the scope of the invention. The invention is therefore not to be limited to the embodiments shown and described, and includes all such modifications defined in the appended claims.

What is claimed is:

1. A steering wheel puller comprising:

an actuator having a steering column engaging portion configured to selectively engage a top portion of a steering column on which a steering wheel is mounted, a plate engaging portion, and a drive mechanism to selectively provide relative movement between the steering column engaging portion and plate engaging portion; and a base plate selectively engaged by said plate engaging portion of said actuator, and having a configuration to positively engage the underside of said steering wheel, wherein upon operation of the drive mechanism, said base plate is selectively moved upwardly relative to the steering column engaging portion to pull said steering wheel upwardly therewith.

2. A steering wheel puller as in claim 1, wherein said steering wheel is retained relative to said actuator and said base plate upon loosening of said wheel relative to said column.

3. A steering wheel puller as in claim 1, wherein said actuator comprises an anvil portion and an anvil screw, wherein said screw is rotated relative to said anvil portion to provide said drive mechanism.

4. A steering wheel puller as in claim 3, wherein said anvil portion has a double plate structure.

5. A steering wheel puller as in claim 1, wherein said base plate includes means for interacting with said plate engaging portion is a pair of feet formed at an end of said anvil portion opposite said anvil screw.

6. A steering wheel puller as in claim 5, wherein said means for interacting is at least one slot formed in said base plate.

7. A steering wheel puller as in claim 1, wherein said actuator portion further comprises a positioning member disposed in relation to said plate engaging portion to facilitate positioning of said base plate with said actuator.

8. A steering wheel puller as in claim 1, wherein said base plate further comprises a back plate extending into engagement with said actuator to facilitate positioning and supporting said base plate.

9. A method for removing a steering wheel comprising the steps of:

providing a steering wheel puller comprising an actuator portion having an anvil portion and an anvil screw; and a base plate having an opening in one end, said opening of sufficient size to fit around a steering column shaft of a steering wheel; said actuator portion having a means for engaging said base plate;

engaging the steering column shaft with the base plate;

placing said actuator portion through an opening in said steering wheel;

connecting said actuator portion to said base plate via said engagement means; and tightening said anvil screw.

* * * * *